US009684089B2

(12) United States Patent
Zhou

(10) Patent No.: US 9,684,089 B2
(45) Date of Patent: Jun. 20, 2017

(54) DETERMINING P-WAVE AZIMUTHAL ANISOTROPY FROM WALKAROUND VSP WITH OFFSET DEPENDENT SLOWNESS CORRECTIONS

(71) Applicant: Halliburton Energy Services, Inc., Houston, TX (US)

(72) Inventor: Ran Zhou, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/916,581

(22) PCT Filed: Nov. 23, 2015

(86) PCT No.: PCT/US2015/062076
§ 371 (c)(1),
(2) Date: Mar. 4, 2016

(87) PCT Pub. No.: WO2016/105765
PCT Pub. Date: Jun. 30, 2016

(65) Prior Publication Data
US 2016/0356909 A1 Dec. 8, 2016

Related U.S. Application Data

(60) Provisional application No. 62/095,977, filed on Dec. 23, 2014.

(51) Int. Cl.
*G01V 1/50* (2006.01)
*G01V 1/46* (2006.01)
(Continued)

(52) U.S. Cl.
CPC ............... *G01V 1/50* (2013.01); *G01V 1/303* (2013.01); *G01V 1/42* (2013.01); *G01V 1/46* (2013.01);
(Continued)

(58) Field of Classification Search
CPC ... G01V 1/20; G01V 1/28; G01V 1/40; G01V 1/46; G01V 1/48
See application file for complete search history.

(56) References Cited

U.S. PATENT DOCUMENTS 4,802,146 A * 1/1989 Moeckel ............... G01V 1/362
367/51
4,802,147 A * 1/1989 Moeckel ............... G01V 1/362
367/57

(Continued)

OTHER PUBLICATIONS

Thomsen, Leon, Weak Elastic Anisotropy, Geophysics, vol. 51, No. 10, 1986, pp. 1954-1966.

(Continued)

*Primary Examiner* — Carol S Tsai
(74) *Attorney, Agent, or Firm* — McDermott Will & Emery LLP

(57) ABSTRACT

A method comprises obtaining vertical seismic profile (VSP) data using seismic sources positioned at corresponding shot locations at desired offsets from seismic receivers positioned in a borehole drilled through a formation. The method further comprises receiving seismic waves emanating from the seismic sources, processing the VSP data to determine vertical slowness of the formation, and analyzing an azimuthal anisotropy of the formation. This is performed by calculating modified total slowness of the formation using the vertical slowness and vertical polarization angle, calculating and applying a polar anisotropy correction to the modified total slowness to obtain a corrected value of the modified total slowness, and normalizing the corrected modified total slowness to a desired polarization angle. The method further comprises estimating azimuthal anisotropy based on the corrected value of the modified total slowness, (Continued)

outputting an anisotropy depth profile of the formation, and performing borehole operations based on the anisotropy depth profile.

21 Claims, 7 Drawing Sheets

(51) Int. Cl.
*G01V 1/30* (2006.01)
*G01V 1/42* (2006.01)

(52) U.S. Cl.
CPC .... *G01V 2210/47* (2013.01); *G01V 2210/626* (2013.01)

(56) References Cited

U.S. PATENT DOCUMENTS

| | | | | |
|---|---|---|---|---|
| 4,894,809 | A * | 1/1990 | Moeckel | G01V 1/362 367/51 |
| 5,012,453 | A * | 4/1991 | Katz | G01V 1/28 367/38 |
| 5,109,947 | A * | 5/1992 | Rector, III | G01V 1/02 181/104 |
| 6,714,480 | B2 * | 3/2004 | Sinha | G01V 1/48 175/40 |
| 6,904,368 | B2 * | 6/2005 | Reshef | G01V 1/362 702/17 |
| 6,944,094 | B1 | 9/2005 | Thomsen et al. | |
| 7,508,735 | B2 | 3/2009 | Grechka et al. | |
| 8,531,913 | B2 * | 9/2013 | Horne | G01V 1/42 367/15 |
| 8,898,020 | B2 * | 11/2014 | Naville | G01V 1/42 367/25 |
| 8,982,671 | B2 | 3/2015 | Willis et al. | |
| 2003/0125878 | A1 * | 7/2003 | Bakulin | G01V 1/30 702/14 |
| 2003/0167835 | A1 * | 9/2003 | Sinha | G01V 1/48 73/152.16 |
| 2007/0115755 | A1 * | 5/2007 | Grechka | G01V 1/42 367/75 |
| 2010/0133010 | A1 * | 6/2010 | Blias | G01V 1/42 175/50 |
| 2012/0046871 | A1 * | 2/2012 | Naville | G01V 1/42 702/17 |

OTHER PUBLICATIONS

Shearer, Peter M., Introduction to Seismology: The Wave Equation and Body Waves, Notes for CIDER Class, Jun. 2010.
Zhou et al., Determining P-Wave Azimuthal Anisotropy from Walkaround VSP with Offset-Dependent Slowness Corrections, Madrid IFEMA, Spain, 77th EAGE Conference & Exhibition, 2015.
Tsvankin, Ilya, Anisotropic Parameters and P-Wave Velocity for Orthorhombic Media, Geophysics, vol. 62, No. 4 (Jul.-Aug. 1997), p. 1292-1309.
Grechka et al., Inversion of P-Wave VSP Data for Local Anisotropy: Theory and Case Study, Geophysics, vol. 72, No. 4 (Jul.-Aug. 2007) p. D69-D79.
Grechka et al., Estimation of Local Seismic Anisotropy from P-Wave VSP Data, SEG/San Antonio 2007 Annual Meeting.
Owusu et al., High-Fidelity Walkaround VSP Anisotropy Analysis, The Leading Edge, Aug. 2009 pp. 966-972.
Horne, Steve, Fracture Characterization from Walkaround VSPs, Geophysical Prospecting, 2003, 51, pp. 493-499.
International Search Report and Written Opinion for PCT/US2015/062076 dated Feb. 5, 2016.

* cited by examiner

DETERMINING P-WAVE AZIMUTHAL ANISOTROPY FROM WALKAROUND VSP WITH OFFSET DEPENDENT SLOWNESS CORRECTIONS

CROSS-REFERENCE TO RELATED APPLICATIONS

This application claims priority under 35 U.S.C. §119 to Provisional Application No. 62/095,977 filed on Dec. 23, 2014, in the United States Patent and Trademark Office.

BACKGROUND

Seismic geophysical surveys are often used in the oil and gas industry in order to map stratigraphy of subterranean formations, lateral continuity of geologic layers, locations of buried paleochannels, positions of faults in sedimentary layers, basement topography, and various other geological structures. The resulting maps are typically deduced through analysis of the nature of reflections and refractions of generated seismic waves from interfaces between the multiple layers within the particular subterranean formation being mapped.

Seismic activity generally emits elastic waves in the form of compressional waves ("P-waves") and shear waves ("S-waves"). The generated P- and S-waves travel through the surrounding earth and are reflected by various subterranean formations to be detected by an adjacent detection system comprising, for example, an array of seismic detection devices, receivers, or "geophones." As the P- and S-waves reach the detection system, the seismic detection devices transduce the P- and S-waves into representative electrical signals that are analyzed to determine the seismic nature of the subterranean formations at the given site.

Historically, the receivers have been placed at the surface. More recently, however, borehole seismology has been undertaken by positioning the receivers in a well borehole. The data collected from the receivers along the borehole is known as a vertical seismic profile (VSP). VSP methods advantageously allow for increased seismic frequency content, which provides greater detail of the geophysical features.

A walkaround VSP can provide various seismic attributes to characterize fractured rocks or stress fields around a well. Direct P-wave arrival time and particle motion polarization extracted from three-component (3-C) data that is recorded by three orthogonal geophones can provide an understanding of fracture or stress-induced azimuthal velocity anisotropy in a depth interval over the receiver array. Consider an ideal situation where a studied area is a horizontally layered medium, the well is vertical, and shots are placed on a circle with a constant offset, which is defined as the horizontal distance between the surface source and the downhole receiver. The measured travel time or the travel time difference over the receiver array, referred to as local slowness, is used to detect and estimate the azimuthal anisotropy.

In a land walkaround survey, multiple shot points are placed about the opening to the well at a constant radial offset from the well. However, land walkaround surveys can be constrained by geographical/geological restrictions (e.g., lack of suitable terrain to place the shots), permit restrictions (e.g., lack of availability of necessary governmental permits to conduct the surveys), and the like, and it may thus not be possible to place all shot points with the same radial offset from the opening to the well. As a result, some shot points may be positioned at different radial offsets, or it may be required to exclude some shot points from the survey. In addition, unconventional shale plays can have vertical transverse isotropy (VTI), also referred to as polar anisotropy. As both azimuthal anisotropy and polar anisotropy are dependent on shot offsets (or polar angles), irregularly placed shot points make it difficult to reveal and quantify the azimuthal anisotropy from the P-wave data.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to methods of P-wave local slowness correction and, more particularly, to P-wave local slowness correction for a walkaround VSP survey in order to minimize offset-dependent biases in azimuthal anisotropy.

Embodiments of the disclosure provide a data processing methodology that determines P-wave velocity azimuthal anisotropy in a background of polar anisotropy from a walkaround VSP survey with variable shot offsets. Because the azimuthal anisotropy is defined and evaluated at equal shot offsets (e.g., shots placed at an equal radial distance from the opening to a borehole), variable offsets may bias the anisotropy measurements. Embodiments disclosed herein provide for methods to correct the offset dependent effects in the walkaround VSP measurements so that the azimuthal anisotropy can be effectively measured.

As described herein, corrections of offset-dependent effects make it possible to use P-wave slowness data to estimate azimuthal anisotropy from a walkaround VSP in which the shots have different offsets. The presently described methods use modified total slowness to minimize the offset dependence of vertical slowness or polarization angle. This may prove advantageous in providing relatively fast turnaround, both direction and magnitude of azimuthal anisotropy, and an additional measure for azimuthal anisotropy.

The term "slowness" conventionally refers to the local travel time differences per distance between receivers located at different locations in the earth over the distance that the receivers are separated from each other.

Figure 1A:
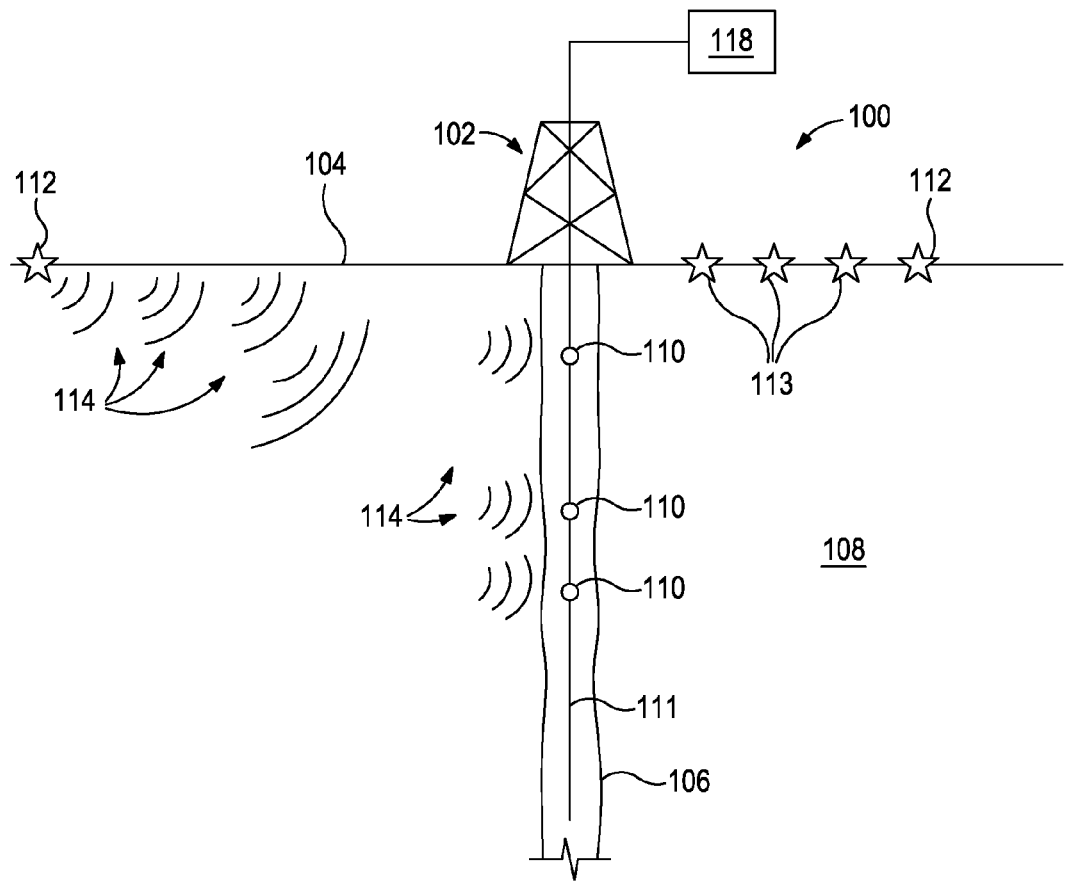
FIG. 1A illustrates a schematic diagram of well system that may employ the principles of the present disclosure.

FIG. 1A shows a well system 100 that may employ the principles of the present disclosure. As illustrated, a wellhead installation 102 is positioned at the Earth's surface 104 and a borehole 106 extends vertically from the wellhead installation 102 and penetrates a subterranean formation 108. The borehole 106 may ultimately penetrate the formation 108 to form a well, or it may be preferred to create a new borehole to form the well. In the present example, the borehole 106 is assumed to extend along a reference direction (e.g., substantially vertically), and the well system 100 may be used to illustrate and otherwise obtain VSP.

An array of seismic receivers 110 is located in the borehole 106 and may be provided in the form of multi-component geophones, such as orthogonal three-component geophones. One of the components of each seismic receiver 110 may be directed along the reference direction; e.g., along the axial direction of the borehole 106. The seismic receivers 110 may be located equidistantly or non-equidistantly spaced from each other and may be introduced into the borehole 106 on a conveyance 111. Although not explicitly illustrated, the cable may be conveyed into the borehole 106 via a pulley system and a wellhead installation, such as a lubricator or the like. The conveyance 111 may include electrical conductors (or any other type of media) for supplying electrical power and/or facilitating communication between the seismic receivers 110 and a data acquisition system 118 coupled thereto.

The data acquisition system 118 may include a processor for processing signals received from the seismic receivers 110. The processor may be communicably coupled to a computer-readable storage medium that stores a program code executed by the processor. The processing results may be displayed to a user on one or more display devices. Examples of a computer-readable storage medium include non-transitory medium such as random access memory (RAM) devices, read only memory (ROM) devices, optical devices (e.g., CDs or DVDs), and disk drives. In some embodiments, the processor may be provided with a user interface (e.g., keyboard, printer, etc.) for input and control. In at least one embodiment, the data acquisition system 118 may be configured to implement the exemplary data processing method and/or performing other tasks as described herein.

Multiple seismic sources (or shots) 112 that generate seismic energy may be arranged at corresponding shot locations on the surface 104 about the borehole 106 and activated to obtain walkaround VSP measurements. Additionally, a plurality of seismic sources 113 may be activated at progressively increasing radial offsets from the borehole 106 to obtain walkaway VSP measurements. The seismic sources 112, 113 may be or include explosives, thumper trucks, electromagnetic pulse energy sources, seismic vibrators, or any other type of source that generates seismic energy.

Figure 1B:
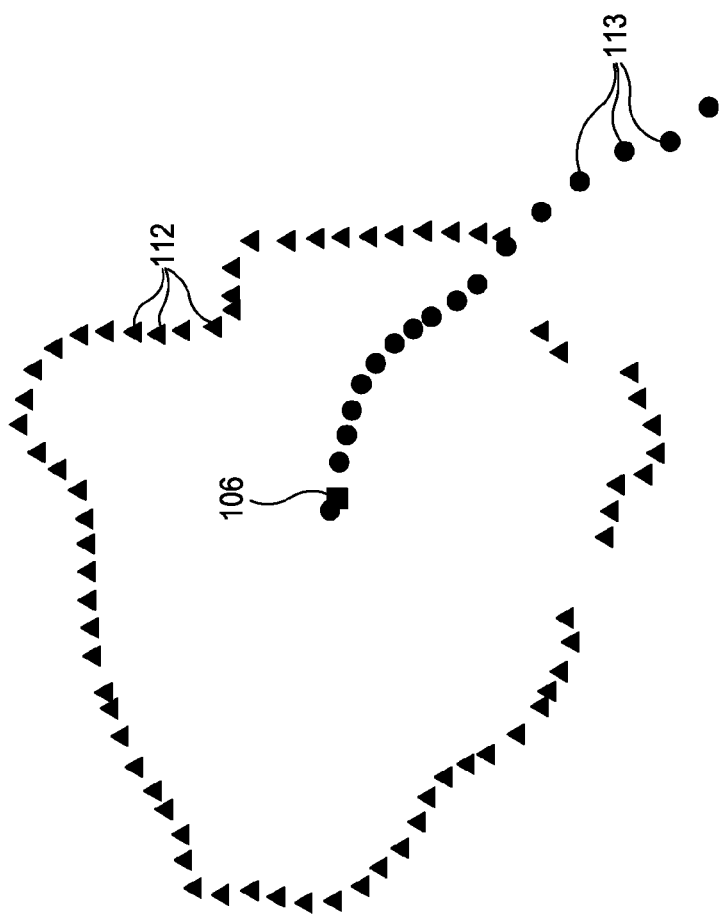
FIG. 1B illustrates a plan view of the well system of FIG. 1A.

FIG. 1B illustrates a plan view of the well system 100 of FIG. 1A. As mentioned above, the seismic sources 112 may not be arranged about the borehole 106 at the same radial offset from the borehole 106. The seismic sources 113 are illustrated as being positioned at progressively increasing and contiguous radial offsets to obtain walkway VSP measurements. Like the seismic sources 112, it may not be possible to deploy the seismic sources 113 along a straight line extending from the borehole 106 due to various constraints, such as geographical/geological restrictions, permit restrictions, and the like.

Referring again to FIG. 1A, the seismic sources 112, 113 induce seismic waves (or seismic energy) 114 that travel through the formation 108 and are received at the seismic receivers 110. The seismic receivers 110 record the seismic waves 114 received through the formation 108, at least partially process the received seismic wave 114, and convert the seismic waves 114 into corresponding electric signals that may be communicated to the data acquisition system 118 for processing. In an example, the seismic sources 112, 113 may be activated simultaneously. In another example the seismic sources 112, 113 may be activated progressively. Although not explicitly illustrated, it will be understood that embodiments discussed herein are equally applicable to situations wherein the seismic waves 114 reflect off various subterranean formations before being received at the seismic receivers 110, without departing from the scope of the disclosure.

The vertical slowness (Sv) at a given seismic receiver 110 may be characterized as dt/dh, where dt represents a change in P-wave arrival times (t) of the seismic waves 114, and dh represents the distance (h) to a vertically adjacent seismic receiver 110. The seismic waves 114 at the locations of the receivers 110, in addition to their propagation velocity and their direction vector (n), also exhibit a polarization vector (U), each of which may be characterized in three-dimensional space relative to the reference direction along the borehole 106 by means of a vertical polarization angle $\psi$ (representing the angle between the polarization vector U and the reference direction) and of an azimuthal angle $\phi$ (representing an azimuthal direction of the polarization vector U around the reference direction).

Figure 2:
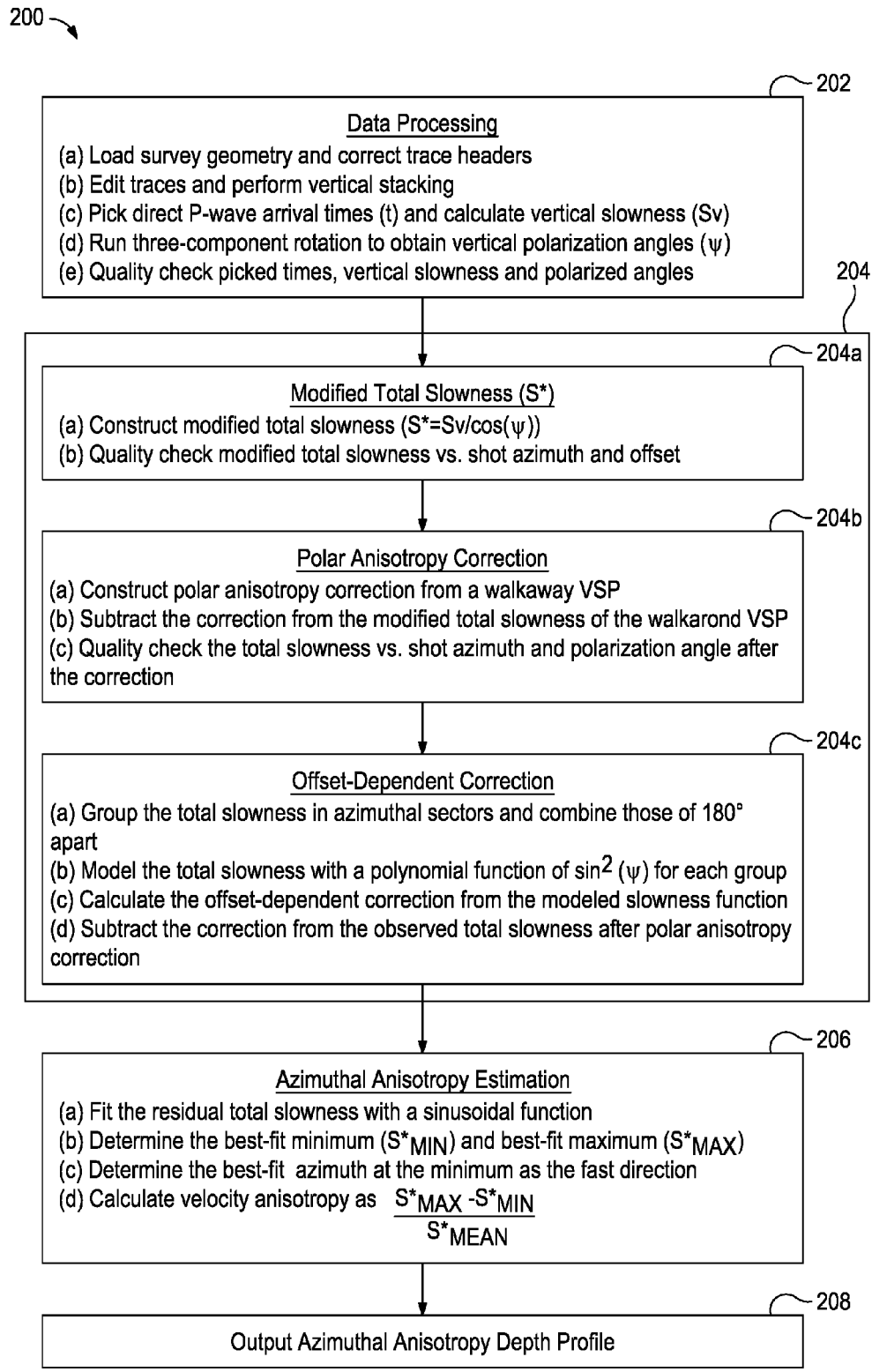
FIG. 2 illustrates a schematic flowchart of a data processing method that uses local slowness data from a walkaround VSP and a walkaway VSP to estimate P-wave azimuthal velocity anisotropy.

FIG. 2 is a schematic flowchart of a data processing method 200 that uses local slowness data from a walkaround VSP and a walkaway VSP to estimate P-wave azimuthal velocity anisotropy. As illustrated, the method 200 may include three main steps, shown as steps 202, 204, and 206, to process the local slowness data in estimating P-wave azimuthal velocity anisotropy. As at 202, the method 200 may include processing the data received during the walkaround VSP and the walkaway VSP seismic logging processes. As illustrated, the data processing may include loading the survey geometry and correcting the trace headers. For instance, the offsets of the seismic sources 112 and 113 (FIGS. 1A and 1B) when obtaining in the walkaround VSP and walkaway VSP measurements may be input to the data acquisition system 118.

The walkaround VSP and walkaway VSP measurements may be displayed on the display device as individual traces. Each trace may represent the response of a seismic wave 114 to velocity and density contrasts across interfaces of layers of rock or sediments as the seismic wave 114 travels from a seismic source 112 (or 113) through the subsurface to a receiver 110. For the purposes of discussion herein, the seismic waves 114 received by the receivers 110 after reflecting from subterranean formations are excluded. Thus, each trace corresponds to a direct path taken by a seismic wave 114 when travelling from a given seismic source 112 (or 113) to a given receiver 110. As is known, a trace header is associated with each trace and the data processing includes examining each trace header and correcting any incorrect or anomalous trace headers.

The data processing at 202 may further include editing the traces and performing vertical stacking. Herein, the traces may be examined and any incorrect traces may be deleted. Vertical stacking may then be performed, via which the signal-to-noise ratio is enhanced by summing the traces from a plurality of shots 112 (or 113) into one set of receivers 110 at a given radial offset. Step 202 may further include picking direct P-wave arrival times (t) of each trace and calculating the vertical slowness (Sv) from the arrival times. A three-component rotation may then be run to obtain vertical polarization angles ψ. Briefly, a three-component rotation includes performing a three-dimensional coordinate rotation of data recorded by a three-component geophone tool. Herein, the three-component geophone tool including three orthogonal geophones is positioned in the borehole such that one of the geophones is positioned in the vertical direction. The three-component geophone tool measures the projection of the P-wave in the three directions. The three-dimensional coordinate rotation of the recorded data is performed to determine the azimuth and vertical angle of the P-wave polarization vector.

Finally, a quality check of the selected direct P-wave arrival times, the vertical slowness, and the polarization angles may then be undertaken. Briefly, such a quality check may include ensuring that the obtained measurements are as to be expected. For instance, the travel times obtained may not be within an expected range or the travel times may indicate that the traces are received from a geological layer different from the geological layer under measurement or survey. In such instances, appropriate corrections may be made, which, for example, may include deleting the travel time measurements from the slowness calculation or moving the traces to the slowness calculation for the next geological layer. The foregoing data processing steps in 202 may prepare the VSP measurements for anisotropy analysis.

The method 200 may further include correcting and analyzing azimuthal anisotropy, as at 204. For step 204, a model of anisotropy with orthorhombic symmetry may be assumed. Using an approximation of weak anisotropy, P-wave phase velocity in an orthorhombic medium may be represented as:

$$V_P(\theta,\varnothing)=V_{P0}[1+\epsilon^{(2)}\sin^2\theta\cos^2\theta+\epsilon^{(2)}\sin^4\theta]+V_{P0}[f_1(\varnothing)\sin^2\theta\cos^2\theta+f_2(\varnothing)\sin^4\theta] \quad (1)$$

wherein δ and ε represent azimuthally dependent coefficients, θ represents the polar phase angle, and Ø represents the azimuthal phase angle.

The first part of Equation (1) represents polar anisotropy measured in a vertical plane, and the second part of Equation (1) represents the contribution of the azimuthal anisotropy to the P-wave phase velocity. As both parts depend on polar angles (or shot offsets), it may be necessary to minimize the offset-dependent effects for a walkaround VSP with significantly different radial offsets. Equation (1) also indicates that the background polar anisotropy and the azimuthal anisotropy can be separated in the case of weak anisotropy. Furthermore, the background polar anisotropy can be obtained from a walkaway line in a symmetry plane or an arbitrary direction as a reference.

Step 204 may be separated into three parts, shown as sub-steps 204a, 204b, and 204c. The data processed in sub-steps 204a-c includes data obtained from walkaround and walkaway VSP measurements. With above assumptions and analysis, the three sub-steps 204a-c are described as follows:

In sub-step 204a, a modified total slowness (S*) may be constructed. Modified total slowness may be defined by the vertical component of P-wave local phase slowness, Sv, and the P-wave polarization angle from vertical, ψ, as follows:

$$S^*=Sv/\cos(\psi) \quad (2)$$

It is advantageous to use the modified total slowness instead of the vertical slowness or polarization angle to analyze an array of VSP data. This may be understood via the plots in FIGS. 3A-3F that depict the P-wave vertical slowness, averaged polarization angle, and the modified total slowness versus shot offset and azimuth for the same depth interval in the borehole 106 (FIG. 1A). For the purposes of discussion herein, it is assumed that the depth interval lies within a same geological layer (e.g., within a layer of the shale) in the formation 108 (FIG. 1A).

Figure 3:
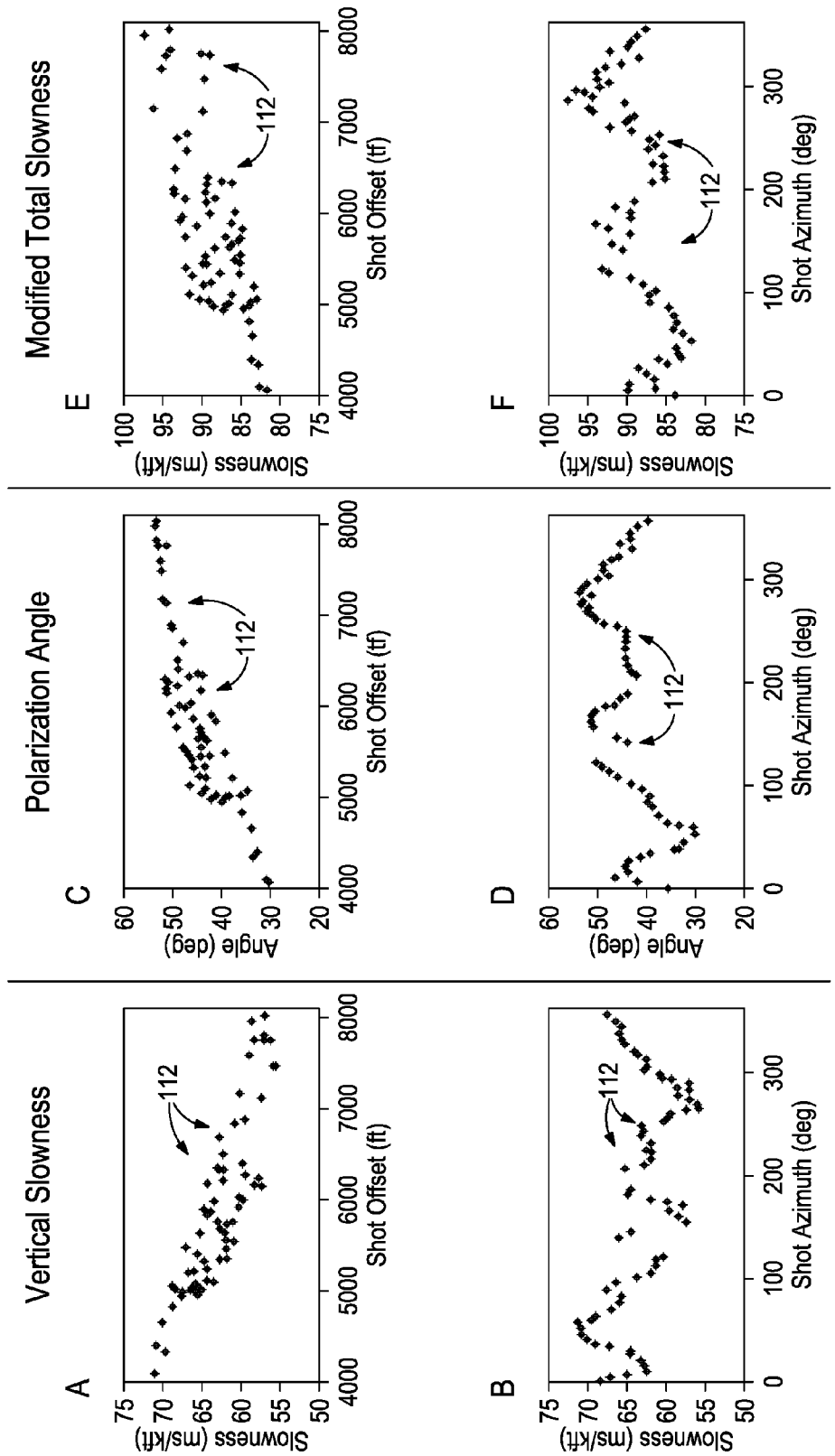
FIG. 3A is a graph depicting the vertical slowness plotted against the shot offsets in FIGS. 1A and 1B.
FIG. 3B is a graph depicting the offset-dependent variation in the vertical slowness plotted against the shot azimuth.
FIG. 3C is a graph depicting the polarization angle plotted against the shot offsets in FIGS. 1A and 1B.
FIG. 3D is a graph depicting the offset-dependent variation in the polarization angle plotted against the shot azimuth.
FIG. 3E is a graph depicting the modified total slowness plotted against the shot offsets in FIGS. 1A and 1B.
FIG. 3F is a graph depicting the offset-dependent variation in the modified total slowness plotted against the shot azimuth.

Specifically, FIG. 3A is a graph depicting the vertical slowness plotted against the shot offsets illustrated in FIG. 1B. The vertical slowness may be calculated from a linear fit to the P-wave travel times (of the seismic waves 114) vs. receiver depths (of the receivers 110). As illustrated, the vertical slowness is inversely proportional to the shot offset and shows a relatively smaller spread over the same offset. The pattern of vertical slowness may be indicative of an azimuthal anisotropy in a background vertical transverse isotropy (or polar anisotropy).

FIG. 3B is a graph depicting the vertical slowness plotted against the shot azimuth. It should be noted that, although the graph illustrates a variation of the vertical slowness with shot azimuth, the azimuthal anisotropy of the formation 108 may be less apparent from the graph.

FIG. 3C is a graph depicting the polarization angle plotted against the shot offsets in FIG. 1B. As illustrated, the polarization angle in FIG. 3C increases with shot offset.

FIG. 3D is a graph depicting the offset-dependent variation in the polarization angle plotted against the shot azimuth. Similar to FIG. 3B, the azimuthal isotropy of the formation 108 may be less apparent based on the variation of the polarization angle with the shot azimuth.

FIG. 3E is a graph depicting the modified total slowness plotted against the shot offsets in FIG. 1B. The modified total slowness is observed to be relatively less dependent on shot offset, since the modified total slowness is a combination of the vertical slowness and polarization and shows a relatively more spread over shot offset compared to FIGS. 3A and 3C.

FIG. 3F is a graph depicting the offset-dependent variation in the modified total slowness plotted against the shot azimuth. Compared to the patterns of the vertical slowness and polarization angle illustrated in FIGS. 3A-3B, the modified total slowness appears to resemble a sinusoidal function, which may be indicative of the azimuthal isotropy of the formation 108. The modified total slowness (S*) may then be quality checked in view of the shot azimuth and offset values. For the values that are out of the expected range, receiver and shot coordinates in the trace headers may be verified and corrected, and the traces with poor wavelet quality may be removed from the calculation.

Referring again to FIG. 2 and sub-step 204b, a polar anisotropy (or VTI) correction may be calculated using the modified total slowness obtained in sub-step 204a. The polar anisotropy correction may be constructed from the walkaway VSP measurements, which results in an estimation of the background polar anisotropy. In some embodiments, constructing the polar anisotropy correction may be accomplished using the slowness-polarization equation for a VTI medium, which may be given as:

$$p_3 \equiv q(\psi) \simeq \frac{\cos\psi}{V_{P0}}(1 + \delta_{VSP}\sin^2\psi + \eta_{VSP}\sin^4\psi).$$

Herein, $p_3 \equiv q$ represents the vertical slowness, $V_{P0}$ represents the vertical P-wave velocity, $\psi$ represents the P-wave polarization angle with the vertical, $\delta$ represents the anisotropic coefficient, and $\eta$ represents the anellipticity coefficient. In other embodiments, constructing the polar anisotropy correction may be accomplished by interpolating the modified total slowness (S*) from the walkaway VSP and using the interpolated values as the correction. In yet other embodiments, constructing the polar anisotropy correction may be accomplished by fitting the modified total slowness (S*) with a second order polynomial of $\sin^2(\psi)$ (or any other desired order polynomial, as required by design) and using the modeled values from the polynomial function as the correction.

The VTI correction may then be applied to the modified total slowness obtained from the walkaround VSP measurement. The polar anisotropy correction may be calculated for each shot location specified by polarization angle $\psi$ and then subtracted from the modified total slowness (S*) of the walkaround VSP.

Figure 4:
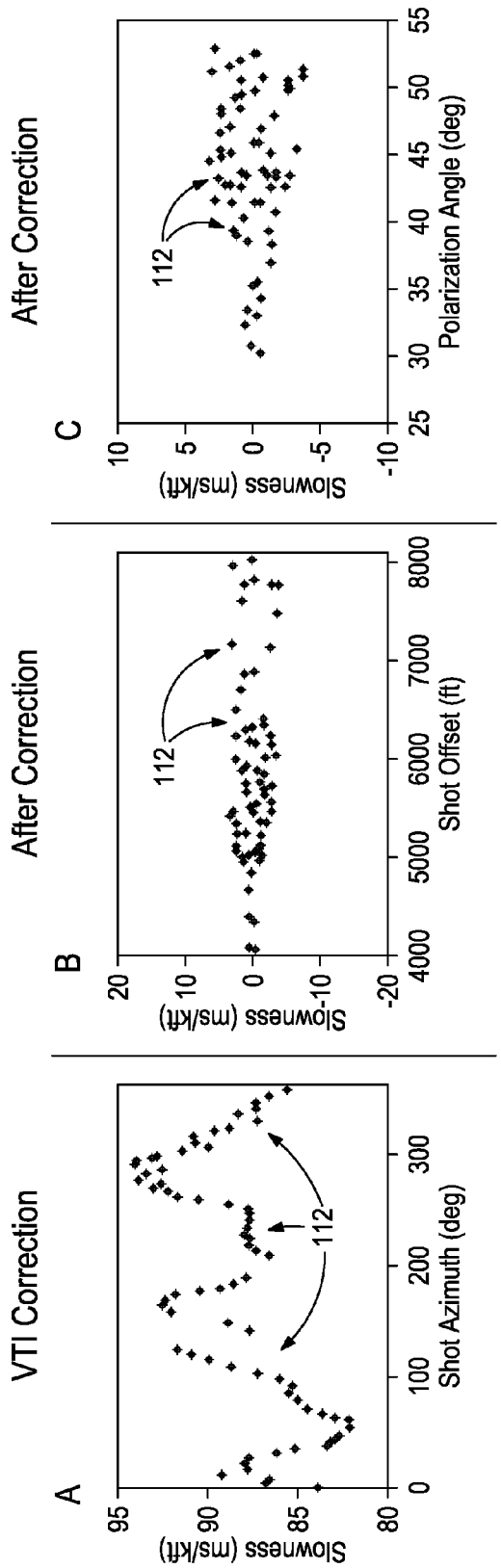
FIG. 4A is a graph illustrating the variation of the vertical transverse isotropy correction for the walkaround VSP with the azimuth of the shots in FIGS. 1A and 1B.
FIG. 4B illustrates the modified total slowness plotted against the offset of the shots used in the walkaround VSP in FIGS. 1A and 1B after the vertical transverse isotropy correction has been applied.
FIG. 4C illustrates the modified total slowness plotted against the polarization angle measured for the various locations of the shots used in the walkaround VSP in FIGS. 1A and 1B after the vertical transverse isotropy correction has been applied.

FIG. 4A is a graph illustrating the variation of the VTI correction with the azimuth of the shots 112 (FIGS. 1A and 1B). The result of the subtraction is illustrated in FIGS. 4B and 4C, wherein it can be observed that the offset-dependent variation in the modified total slowness appears to be minimized after the correction. FIG. 4B illustrates the modified total slowness plotted against the offset of the shots 112 after performing the VTI correction using the walkaway VSP, and FIG. 4C illustrates the modified total slowness plotted against the polarization angle measured for the various locations of the shots 112. Subsequently, a quality check may be run to verify the modified total slowness (S*) in view of the shot azimuth and polarization angle after the correction. Herein, the quality check may include checking if the correlation of the modified total slowness with shot offset or polarization angle is minimized. Stated otherwise, it may include checking whether the spread of the slowness over the same offset or polarization angle is symmetric. The modified total slowness after the VTI correction, as in FIG. 4C, indicates a residual effect of offset dependence after the VTI correction, as observed in the second part of Equation (1). The sub-step 204c aims to minimize this offset-dependent effect.

Referring again to FIG. 2 and sub-step 204c, a correction is performed to normalize the azimuthal contribution to a reference offset (or polarization angle) to obtain the modified total slowness that has been corrected for the background VTI effect. As demonstrated by Equation (1), the azimuthal contribution is also dependent on the offset (or polarization angle). In order to perform this correction, the modified total slowness (FIG. 4C) in intervals of constant azimuths may first be grouped. This may be accomplished by dividing the shot point locations into equal azimuthal sectors (e.g., around 10°), and combining the two azimuth sectors that are separated by 180° due to the symmetry. As will be appreciated, the combined group should have two or more shots.

Figure 5A:
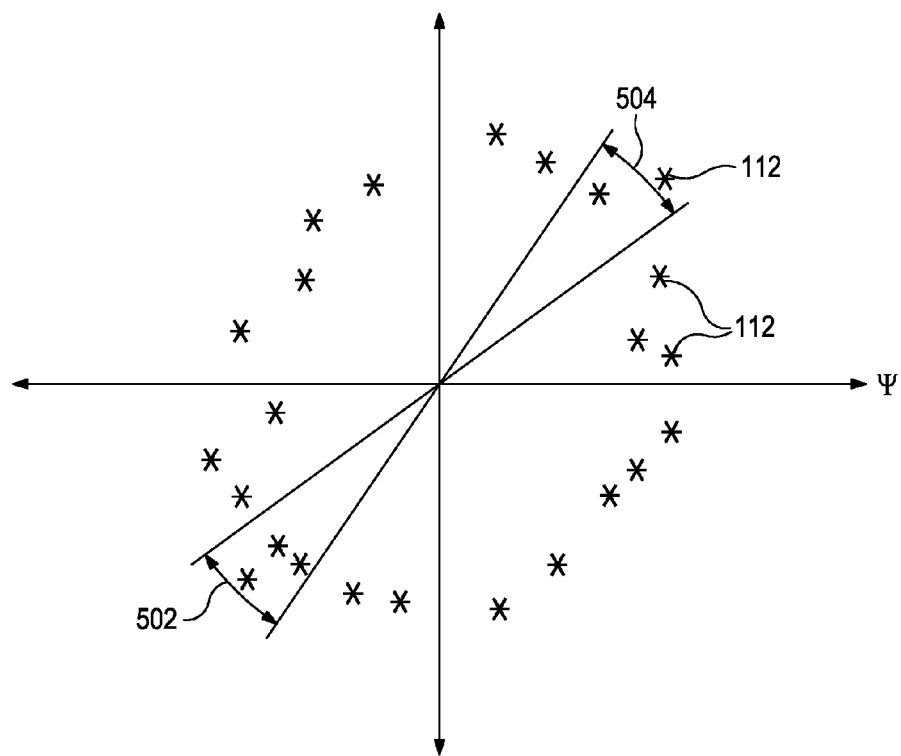
FIG. 5A illustrates the exemplary arrangement of the modified total slowness measured for the shots in FIGS. 1A and 1B.

FIG. 5A illustrates the exemplary arrangement of the modified total slowness measured for the shots 112. As illustrated, the shots 112 that are separated by 180° in the azimuthal sectors 502 and 504 may be combined. The modified total slowness may then be modelled with a polynomial function of $\sin^2(\psi)$ for each group.

Further, for each azimuthal sector (e.g., the azimuthal sectors 502 and 504), a polynomial function of the first or second order is chosen to fit the modified total slowness, a reference value $S_0^*$; of the modified total slowness is computed from the fitted curve at a reference polarization angle, and the modeled value of the modified total slowness is calculated from the fitted curve for each shot in the group. In an example, the reference polarization angle may be the mean of the polarization angles of the shots 112 (FIG. 1A) calculated for the walkaround VSP over the depth interval of interest. The difference between the modeled value of the modified total slowness and the reference value may then be subtracted from the modified total slowness after VTI correction. The resultant modified total slowness may then be normalized to the reference polarization angle (or offset). The calculated value of the modified total slowness may be obtained using one or more desired algorithms, one of which may generally be represented as $S^* = a + b\sin^2(\psi) + c\sin^4(\psi)$, where a, b, and c are arbitrary constants.

Figure 5B:
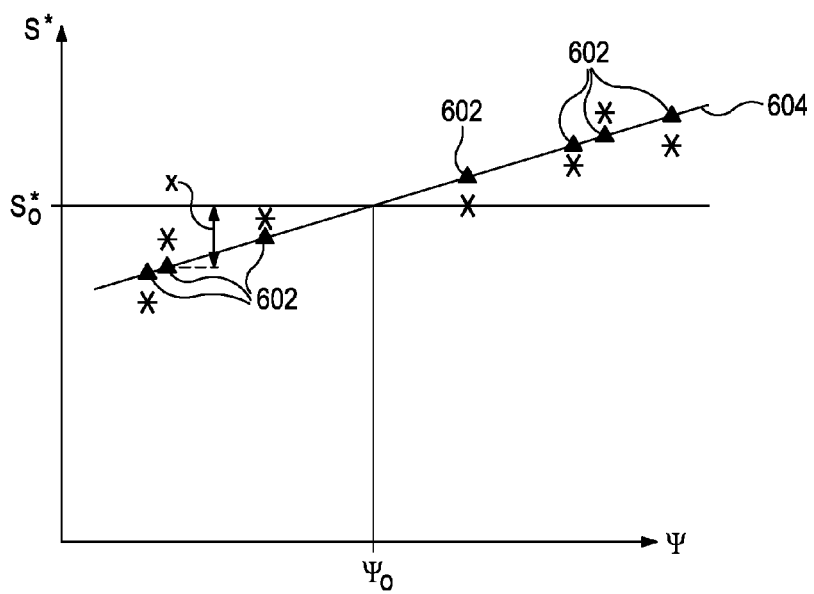
FIG. 5B is a graph illustrating the observed values and modeled values of the modified total slowness (S*) plotted against the polarization angles ($\psi$).

FIG. 5B is a graph illustrating the observed values and modeled values of the modified total slowness (S*) plotted against the polarization angles ($\psi$). As illustrated, the modeled values 602 for each value of the modified total slowness are obtained from the fitted curve 604. In FIG. 5B, $\psi_0$ represents the mean polarization angle, $S_0^*$ represents the reference value of the modified total slowness, and x represents the difference between a modeled value of the modified total slowness and the reference value of the modified total slowness.

Figure 6:
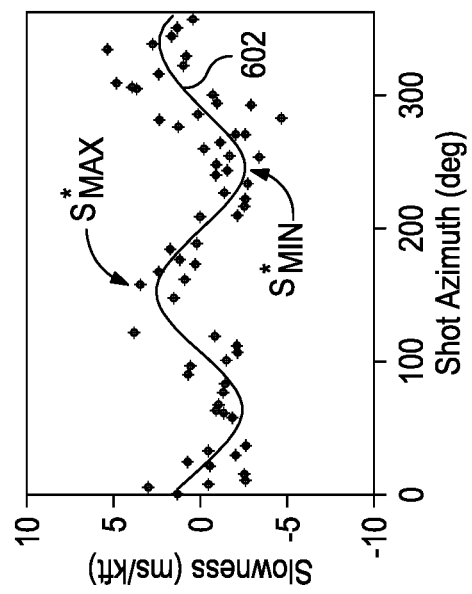
FIG. 6 illustrates the variation in the modified total slowness with the shot azimuth after performing the correction sub-set in FIG. 2.

FIG. 6 illustrates the variation in the modified total slowness with the shot azimuth after the correction described in sub-step 204c (FIG. 2) is performed. As can be seen, the non-sinusoidal variation in the modified total slowness in FIG. 3F is reduced and the variation in FIG. 6 is relatively well defined compared to the variation in the modified total slowness observed in FIG. 3F. The estimated fast direction and azimuthal anisotropy for the depth interval in the borehole 106 can be obtained from FIG. 6.

Again referring to FIG. 2, the method 200 may further include estimating azimuthal anisotropy, as at 206. In an example, a sinusoidal function may be fitted to the corrected slowness data arranged by shot azimuth. An exemplary sinusoidal function fitted to the corrected slowness data (obtained at sub-step 204c) is illustrated by the solid curve 602 n FIG. 6. From the curve, the best-fit minimum ($S^*_{MIN}$) and best-fit maximum ($S^*_{MAX}$) may then be determined. The best-fit azimuth at the minimum may then be determined as the fast direction. The velocity azimuthal anisotropy may then be calculated as the ratio of the maximum and minimum slowness difference to the mean of uncorrected slowness, and may be represented as $$\frac{S^*_{MAX} - S^*_{MIN}}{S^*_{MEAN}}.$$

The method 200 may further include outputting an anisotropy depth profile, as at 208. The output from the above analysis may comprise a layer-based azimuthal anisotropy profile listed as a function of depth. Based on the azimuthal anisotropy profile, the location and orientation of the natural fractures or of other sources of stress, anisotropy, etc. in the geological formation being surveyed may be determined. The location and orientation information may be used to perform borehole operations including, but not limited to drilling, hydraulic fracturing, reservoir monitoring, enhanced oil recovery (EOR), and the like.

Embodiments disclosed herein include:

A. A method that includes obtaining vertical seismic profile (VSP) data for a well using seismic sources positioned at a corresponding one or more shot locations, the one or more shot locations being at desired offsets from one or more seismic receivers positioned in a borehole drilled through a formation, and receiving seismic waves emanating from the seismic sources with the one or more seismic receivers, processing the VSP data to determine vertical slowness of the formation surrounding the borehole and determine vertical polarization angles of the seismic waves received by the one or more seismic receivers, correcting and analyzing an azimuthal anisotropy of the formation by: calculating modified total slowness of the formation using the vertical slowness and the vertical polarization angles, calculating and applying a polar anisotropy correction to the modified total slowness to obtain a corrected value of the modified total slowness, and normalizing the corrected modified total slowness of the formation to a desired polarization angle, estimating azimuthal anisotropy of the formation based on the corrected value of the modified total slowness, outputting an anisotropy depth profile of the formation, and performing one or more borehole operations based on the anisotropy depth profile.

B. A system that includes one or more seismic receivers positioned in a borehole drilled through a formation, and seismic sources positioned on a surface at a corresponding one or more shot locations at desired offsets from the one or more seismic receivers, the seismic sources emanating seismic waves that are received by the one or more seismic receivers, a data acquisition system including a processor and a non-transitory computer readable medium, the one or more seismic receivers communicatively coupled to the data acquisition system, wherein the computer readable medium stores a computer readable program code that, when executed by the processor, configures the processor to: undertake a vertical seismic profile (VSP) operation and thereby obtaining VSP data of a well, the VSP data being obtained by detonating the seismic sources receiving seismic waves emanating from the sources with one or more seismic receivers positioned in a borehole drilled in a formation, process the VSP data to determine vertical slowness of the formation surrounding the borehole and to determine vertical polarization angles of the seismic waves received by the one or more seismic receivers, correct and analyzing an azimuthal anisotropy of the formation by: calculating modified total slowness of the formation using the vertical slowness and the vertical polarization angles, calculating and applying a polar anisotropy correction to the modified total slowness to obtain a corrected value of the modified total slowness, and normalizing the corrected modified slowness of the formation to a desired polarization angle, estimate azimuthal anisotropy of the formation based on the corrected value of the modified total slowness, output an anisotropy depth profile of the formation, and perform one or more well operations based on the anisotropy depth profile.

Each of embodiments A and B may have one or more of the following additional elements in any combination: Element 1: wherein processing the VSP data comprises loading survey geometry into a data processor, correcting and editing trace headers with the data processor, performing vertical stacking of the VSP data, choosing direct arrival times of compressional waves (P-waves) of the seismic waves and calculating the vertical slowness of the formation based on the direct arrival times of the P-waves, and running a three-component rotation to obtain vertical polarization angles of the P-waves. Element 2: further comprising undertaking a quality check operation of the direct arrival times of the P-waves, the vertical slowness, and the vertical polarization angles of the P-waves. Element 3: wherein the VSP data is obtained by undertaking a walkaway VSP survey and calculating the polar anisotropy correction comprises constructing the polar anisotropy correction from the VSP data and thereby estimating a background polar anisotropy. Element 4: wherein constructing the polar anisotropy correction from the VSP data comprises interpolating the modified total slowness from the VSP data obtained from the walkaway VSP survey to obtain interpolated values, and using the interpolated values as the polar anisotropy correction. Element 5: wherein constructing the polar anisotropy correction from the VSP data comprises fitting the modified total slowness with a polynomial of $\sin^2(\psi)$ and thereby obtaining modeled values, where iv represents a vertical polarization angle, and using the modeled values from the polynomial as the polar anisotropy correction. Element 6: wherein the VSP data is further obtained by undertaking a walkaround VSP survey and the method further comprises calculating the polar anisotropy correction for each shot location specified by a polarization angle obtained from the walkaround VSP survey, and subtracting the polar anisotropy correction for each shot location from the modified total slowness obtained from the walkaround VSP survey. Element 7: wherein the VSP data is obtained by undertaking a walkaround VSP survey, and wherein normalizing the azimuthal anisotropy of the formation to the desired polarization angle is performed in azimuthal sectors and comprises grouping the modified total slowness in shot intervals of constant azimuths, modeling the modified total slowness with a polynomial function of $\sin^2(\psi)$ for each group and thereby obtaining a modeled value of the modified total slowness, where $\psi$ represents a vertical polarization angle, selecting the desired polarization angle as a mean of the vertical polarization angles of compressional waves (P-waves) of the seismic waves generated by the seismic sources, selecting a polynomial function of a desired order to fit the modified total slowness, computing a reference value of the modeled total slowness at the desired polarization angle, and calculating the modified total slowness from the fitted polynomial function for each seismic source in the group, and subtracting a difference between the modeled value and the reference value from the modified total slowness after the polar anisotropy correction to obtain normalized total slowness. Element 8: wherein grouping the modified total slowness in shot intervals of constant azimuths comprises dividing the shot locations into equal azimuthal sectors, and combining two shot intervals that are separated by 180° into a group including two or more seismic sources. Element 9: wherein estimating the azimuthal anisotropy comprises fitting a sinusoidal function to the corrected value of the modified total slowness arranged by shot azimuth, determining a best-fit minimum and a best-fit maximum of the sinusoidal function, determining a best-fit azimuth at the best-fit minimum, and thereby determining a fast direction, and calculating the azimuthal anisotropy using a difference between the best-fit minimum and the best-fit maximum and dividing the difference by a mean value of the modified total slowness calculated at the reference polarization angle.

Element 10: wherein the processor is further configured to process the VSP data by loading survey geometry of the VSP operation, correcting and editing trace headers, performing vertical stacking of the VSP data, choosing direct arrival times of compressional waves (P-waves) of the seismic waves and calculating the vertical slowness of the formation based on the direct arrival times of the P-waves, and running a three-component rotation to obtain vertical polarization angles of the P-waves. Element 11: wherein the processor is further configured to undertake a quality check operation of the direct arrival times of the P-waves, the vertical slowness, and the vertical polarization angles of the P-waves at each seismic receiver. Element 12: wherein the VSP data is obtained by undertaking a walkaway VSP survey and the processor is further configured to calculate the polar anisotropy correction by constructing the polar anisotropy correction from the VSP data and thereby estimating a background polar anisotropy. Element 13: wherein the processor is further configured to construct the polar anisotropy correction from the VSP data by interpolating the modified total slowness from the VSP data obtained from the walkaway VSP survey to obtain interpolated values, and using the interpolated values as the polar anisotropy correction. Element 14: wherein the processor is further configured to construct the polar anisotropy correction from the VSP data by fitting the modified total slowness with a polynomial of $\sin^2(\psi)$ and thereby obtaining modeled values, where $\psi$ represents a vertical polarization angle, and using the modeled values from the polynomial as the polar anisotropy correction. Element 15: wherein the VSP data is further obtained by undertaking a walkaround VSP survey and wherein the processor is further configured to calculate the polar anisotropy correction for each shot location specified by a polarization angle obtained from the walkaround VSP survey, and subtract the polar anisotropy correction for each shot location from the modified total slowness obtained from the walkaround VSP survey. Element 16: wherein the VSP data is obtained by undertaking a walkaround VSP survey, and wherein the processor is further configured to normalize the azimuthal anisotropy of the formation to the desired polarization angle in azimuthal sectors by grouping the modified total slowness in shot intervals of constant azimuths, modeling the modified total slowness with a polynomial function of $\sin^2(\psi)$ for each group and thereby obtaining a modeled value of the modified total slowness, wherein $\psi$ represents a vertical polarization angle, selecting the desired polarization angle as a mean of the vertical polarization angles of the compressional waves (P-waves) of the seismic waves generated by the one or more seismic sources, selecting a polynomial function of a desired order to fit the modified total slowness, computing a reference value of the modeled total slowness at the desired polarization angle, and calculating the modified total slowness from the fitted polynomial function for each seismic source in the group, and subtracting a difference between the modeled value and the reference value from the modified total slowness after the polar anisotropy correction to obtain normalized total slowness. Element 17: wherein the processor is further configured to group the modified total slowness in shot intervals of constant azimuths by dividing the shot locations into equal azimuthal sectors, and combining two shot intervals that are separated by 180° into a group including two or more seismic sources. Element 18: wherein the processor is further configured to estimate the azimuthal anisotropy by fitting a sinusoidal function to the corrected value of the modified total slowness arranged by shot azimuth, finding a best-fit minimum and a best-fit maximum, finding a best-fit azimuth at the best-fit minimum, and thereby determining a fast direction, and calculating the azimuthal anisotropy using the difference between the best-fit minimum and the best-fit maximum and dividing the difference by a mean value of the modified total slowness calculated at the reference polarization angle.

By way of non-limiting example, exemplary combinations applicable to A and B include: Element 1 with Element 2; Element 3 with Element 4; Element 3 with Element 5; Element 3 with Element 6; Element 7 with Element 8; Element 10 with Element 11; Element 12 with Element 13; and Element 12 with Element 14; Element 12 with Element 15; Element 16 with Element 17;

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below.

It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A method, comprising:
    obtaining vertical seismic profile (VSP) data for a well using one or more seismic receivers positioned in a borehole drilled through a formation, the one or more seismic receivers receiving seismic waves emanating from seismic sources positioned at a corresponding one or more shot locations at desired offsets from the one or more seismic receivers;
    processing the VSP data to determine vertical slowness of the formation surrounding the borehole and to determine vertical polarization angles of the seismic waves received by the one or more seismic receivers;
    correcting and analyzing an azimuthal anisotropy of the formation by:
        calculating modified total slowness of the formation using the vertical slowness and the vertical polarization angles;
        calculating and applying a polar anisotropy correction to the modified total slowness to obtain a corrected value of the modified total slowness; and
        normalizing the corrected modified total slowness of the formation to a desired polarization angle;
    estimating azimuthal anisotropy of the formation based on the corrected value of the modified total slowness; and
    outputting an anisotropy depth profile of the formation.

2. The method of claim 1, wherein processing the VSP data comprises:
    loading survey geometry into a data processor;
    correcting and editing trace headers with the data processor;
    performing vertical stacking of the VSP data;
    choosing direct arrival times of compressional waves (P-waves) of the seismic waves and calculating the vertical slowness of the formation based on the direct arrival times of the P-waves; and
    running a three-component rotation to obtain vertical polarization angles of the P-waves.

3. The method of claim 2, further comprising undertaking a quality check operation of the direct arrival times of the P-waves, the vertical slowness, and the vertical polarization angles of the P-waves.

4. The method of claim 1, wherein the VSP data is obtained by undertaking a walkaway VSP survey and calculating the polar anisotropy correction comprises constructing the polar anisotropy correction from the VSP data and thereby estimating a background polar anisotropy.

5. The method of claim 4, wherein constructing the polar anisotropy correction from the VSP data comprises:
    interpolating the modified total slowness from the VSP data obtained from the walkaway VSP survey to obtain interpolated values; and
    using the interpolated values as the polar anisotropy correction.

6. The method of claim 4, wherein constructing the polar anisotropy correction from the VSP data comprises:
    fitting the modified total slowness with a polynomial of $\sin^2(\psi)$ and thereby obtaining modeled values, where $\psi$ represents a vertical polarization angle; and
    using the modeled values from the polynomial as the polar anisotropy correction.

7. The method of claim 4, wherein the VSP data is further obtained by undertaking a walkaround VSP survey and the method further comprises:
    calculating the polar anisotropy correction for each shot location specified by a polarization angle obtained from the walkaround VSP survey; and
    subtracting the polar anisotropy correction for each shot location from the modified total slowness obtained from the walkaround VSP survey.

8. The method of claim 1, wherein the VSP data is obtained by undertaking a walkaround VSP survey, and wherein normalizing the azimuthal anisotropy of the formation to the desired polarization angle is performed in azimuthal sectors and comprises:
    grouping the modified total slowness in shot intervals of constant azimuths;
    modeling the modified total slowness with a polynomial function of $\sin^2(\psi)$ for each group and thereby obtaining a modeled value of the modified total slowness, where $\psi$ represents a vertical polarization angle;
    selecting the desired polarization angle as a mean of the vertical polarization angles of compressional waves (P-waves) of the seismic waves generated by the seismic sources, selecting a polynomial function of a desired order to fit the modified total slowness, computing a reference value of the modeled total slowness at the desired polarization angle, and calculating the modified total slowness from the fitted polynomial function for each seismic source in the group; and
    subtracting a difference between the modeled value and the reference value from the modified total slowness after the polar anisotropy correction to obtain normalized total slowness.

9. The method of claim 8, wherein grouping the modified total slowness in shot intervals of constant azimuths comprises:
    dividing the shot locations into equal azimuthal sectors; and
    combining two shot intervals that are separated by 180° into a group including two or more seismic sources.

10. The method of claim 1, wherein estimating the azimuthal anisotropy comprises:
    fitting a sinusoidal function to the corrected value of the modified total slowness arranged by shot azimuth;
    determining a best-fit minimum and a best-fit maximum of the sinusoidal function;
    determining a best-fit azimuth at the best-fit minimum, and thereby determining a fast direction; and
    calculating the azimuthal anisotropy using a difference between the best-fit minimum and the best-fit maximum and dividing the difference by a mean value of the modified total slowness calculated at the reference polarization angle.

11. A system, comprising:
    one or more seismic receivers positioned in a borehole drilled through a formation; and
    seismic sources positioned on a surface at a corresponding one or more shot locations at desired offsets from the one or more seismic receivers, the seismic sources emanating seismic waves that are received by the one or more seismic receivers;

a data acquisition system including a processor and a non-transitory computer readable medium, the one or more seismic receivers communicatively coupled to the data acquisition system, wherein the computer readable medium stores a computer readable program code that, when executed by the processor, configures the processor to:

undertake a vertical seismic profile (VSP) operation and thereby obtain VSP data of a well, the VSP data being obtained by detonating the seismic sources and receiving the seismic waves with the one or more seismic receivers;

process the VSP data to determine vertical slowness of the formation surrounding the borehole and to determine vertical polarization angles of the seismic waves received by the one or more seismic receivers;

correct and analyze an azimuthal anisotropy of the formation by:
calculating modified total slowness of the formation using the vertical slowness and the vertical polarization angles;
calculating and applying a polar anisotropy correction to the modified total slowness to obtain a corrected value of the modified total slowness; and
normalizing the corrected modified slowness of the formation to a desired polarization angle;

estimate azimuthal anisotropy of the formation based on the corrected value of the modified total slowness; and output an anisotropy depth profile of the formation.

12. The system of claim 11, wherein the processor is further configured to process the VSP data by:
loading survey geometry of the VSP operation;
correcting and editing trace headers;
performing vertical stacking of the VSP data;
choosing direct arrival times of compressional waves (P-waves) of the seismic waves and calculating the vertical slowness of the formation based on the direct arrival times of the P-waves; and
running a three-component rotation to obtain vertical polarization angles of the P-waves.

13. The system of claim 12, wherein the processor is further configured to undertake a quality check operation of the direct arrival times of the P-waves, the vertical slowness, and the vertical polarization angles of the P-waves at each seismic receiver.

14. The system of claim 11, wherein the VSP data is obtained by undertaking a walkaway VSP survey and the processor is further configured to calculate the polar anisotropy correction by constructing the polar anisotropy correction from the VSP data and thereby estimating a background polar anisotropy.

15. The system of claim 14, wherein the processor is further configured to construct the polar anisotropy correction from the VSP data by:
interpolating the modified total slowness from the VSP data obtained from the walkaway VSP survey to obtain interpolated values; and
using the interpolated values as the polar anisotropy correction.

16. The system of claim 14, wherein the processor is further configured to construct the polar anisotropy correction from the VSP data by:
fitting the modified total slowness with a polynomial of $\sin^2(\psi)$ and thereby obtaining modeled values, where $\psi$ represents a vertical polarization angle; and
using the modeled values from the polynomial as the polar anisotropy correction.

17. The system of claim 14, wherein the VSP data is further obtained by undertaking a walkaround VSP survey and wherein the processor is further configured to:
calculate the polar anisotropy correction for each shot location specified by a polarization angle obtained from the walkaround VSP survey; and
subtract the polar anisotropy correction for each shot location from the modified total slowness obtained from the walkaround VSP survey.

18. The system of claim 11, wherein the VSP data is obtained by undertaking a walkaround VSP survey, and wherein the processor is further configured to normalize the azimuthal anisotropy of the formation to the desired polarization angle in azimuthal sectors by:
grouping the modified total slowness in shot intervals of constant azimuths;
modeling the modified total slowness with a polynomial function of $\sin^2(\psi)$ for each group and thereby obtaining a modeled value of the modified total slowness, wherein $\psi$ represents a vertical polarization angle;
selecting the desired polarization angle as a mean of the vertical polarization angles of the compressional waves (P-waves) of the seismic waves generated by the one or more seismic sources, selecting a polynomial function of a desired order to fit the modified total slowness, computing a reference value of the modeled total slowness at the desired polarization angle, and calculating the modified total slowness from the fitted polynomial function for each seismic source in the group; and
subtracting a difference between the modeled value and the reference value from the modified total slowness after the polar anisotropy correction to obtain normalized total slowness.

19. The system of claim 18, wherein the processor is further configured to group the modified total slowness in shot intervals of constant azimuths by:
dividing the shot locations into equal azimuthal sectors; and
combining two shot intervals that are separated by 180° into a group including two or more seismic sources.

20. The system of claim 11, wherein the processor is further configured to estimate the azimuthal anisotropy by:
fitting a sinusoidal function to the corrected value of the modified total slowness arranged by shot azimuth;
finding a best-fit minimum and a best-fit maximum;
finding a best-fit azimuth at the best-fit minimum, and thereby determining a fast direction; and
calculating the azimuthal anisotropy using a difference between the best-fit minimum and the best-fit maximum and dividing the difference by a mean value of the modified total slowness calculated at the reference polarization angle.

21. A method, comprising:
positioning one or more seismic receivers in a borehole of a well drilled through a formation;
generating seismic waves using a plurality of seismic sources positioned at a corresponding one or more shot locations at desired offsets from the one or more seismic receivers;
receiving the seismic waves using the one or more seismic receivers;

obtaining vertical seismic profile (VSP) data for a well using the one or more seismic receivers;

processing the VSP data to determine vertical slowness of the formation surrounding the borehole and to determine vertical polarization angles of the seismic waves received by the one or more seismic receivers;

correcting and analyzing an azimuthal anisotropy of the formation by:

calculating modified total slowness of the formation using the vertical slowness and the vertical polarization angles;

calculating and applying a polar anisotropy correction to the modified total slowness to obtain a corrected value of the modified total slowness; and normalizing the corrected modified total slowness of the formation to a desired polarization angle;

estimating azimuthal anisotropy of the formation based on the corrected value of the modified total slowness; and outputting an anisotropy depth profile of the formation.

\* \* \* \* \*